US010055726B2

(12) United States Patent
Kursun et al.

(10) Patent No.: US 10,055,726 B2
(45) Date of Patent: Aug. 21, 2018

(54) SYSTEMS AND METHODS FOR MANAGEMENT OF MOBILE BANKING RESOURCES

(71) Applicant: JPMorgan Chase Bank, N.A., New York, NY (US)

(72) Inventors: Eren Kursun, New York, NY (US); Sih Lee, Northvale, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 512 days.

(21) Appl. No.: 14/554,930

(22) Filed: Nov. 26, 2014

(65) Prior Publication Data
US 2016/0012411 A1    Jan. 14, 2016

Related U.S. Application Data (60) Provisional application No. 62/024,310, filed on Jul. 14, 2014, provisional application No. 62/024,407, filed on Jul. 14, 2014.

(51) Int. Cl.
| | | |
|---|---|---|
| *G06Q 40/02* | (2012.01) | |
| *G06Q 20/10* | (2012.01) | |
| *G07F 19/00* | (2006.01) | |
| *G06Q 20/32* | (2012.01) | |

(52) U.S. Cl.
CPC ....... *G06Q 20/3221* (2013.01); *G06Q 20/108* (2013.01); *G06Q 40/02* (2013.01); *G07F 19/205* (2013.01)

(58) Field of Classification Search
CPC ......... G06Q 40/02; G06Q 20/10; G07F 19/00

USPC ............................................. 705/44; 235/379
See application file for complete search history.

(56) References Cited

U.S. PATENT DOCUMENTS

| | | | | | |
|---|---|---|---|---|---|
| 5,363,027 | A | * | 11/1994 | Noguchi | ................. F16H 61/28 318/266 |
| 5,923,270 | A | * | 7/1999 | Sampo | ................. A01B 69/008 180/6.7 |
| 6,049,745 | A | * | 4/2000 | Douglas | ............... G05D 1/0261 180/168 |
| 6,085,131 | A | * | 7/2000 | Kim | ..................... G05D 1/0246 180/168 |
| 6,151,539 | A | * | 11/2000 | Bergholz | ............. G01S 13/931 340/435 |
| 6,879,889 | B2 | * | 4/2005 | Ross | ...................... B60L 5/005 180/167 |

(Continued)

OTHER PUBLICATIONS

International Search Report dated Sep. 30, 2015 for PCT application No. PCT/US2015/040122.

(Continued)

*Primary Examiner* — Sara Chandler Hamilton
(74) *Attorney, Agent, or Firm* — Hunton Andrews Kurth LLP (57) ABSTRACT

Systems and methods for the management of mobile banking resources are disclosed. In one embodiment, a self-propelled, mobile transaction resource may include an unmanned, self-propelled, mobile platform; a user interface for interfacing with a user for conducting a transaction; at least one controller that controls the movement of the mobile platform and the user interface; a communications interface for the at least one controller that communicates with a server; and a plurality of sensors that capture at least one characteristic of the user.

14 Claims, 7 Drawing Sheets

(56) References Cited

U.S. PATENT DOCUMENTS

| | | | |
|---|---|---|---|
| 7,174,836 B2* | 2/2007 | Marino | B61L 27/04 104/88.02 |
| 7,404,515 B1* | 7/2008 | Shepley | G06F 3/023 235/379 |
| 7,561,948 B2* | 7/2009 | Gaegauf | B61B 3/02 180/168 |
| 2002/0074394 A1 | 6/2002 | Birnie | |
| 2004/0149819 A1* | 8/2004 | Shepley | G07F 19/20 235/379 |
| 2005/0058325 A1* | 3/2005 | Udupa | G06K 9/00087 382/125 |
| 2005/0263583 A1* | 12/2005 | Schlabach | G06Q 10/06 235/379 |
| 2006/0136574 A1 | 6/2006 | Anand | |
| 2006/0273151 A1* | 12/2006 | Block | G07F 19/20 235/379 |
| 2007/0219666 A1* | 9/2007 | Filippov | H04L 67/12 700/245 |
| 2007/0271457 A1 | 11/2007 | Patil | |
| 2008/0243690 A1* | 10/2008 | Paintin | G06Q 20/10 705/44 |
| 2009/0125174 A1 | 5/2009 | Delean | |
| 2009/0299563 A1* | 12/2009 | Mikosza | B60F 1/00 701/25 |
| 2009/0326735 A1* | 12/2009 | Wood | G05D 1/0027 701/2 |
| 2010/0012718 A1* | 1/2010 | Griswold | G07F 19/20 235/379 |
| 2010/0114734 A1 | 5/2010 | Giuli et al. | |
| 2012/0194319 A1* | 8/2012 | Kang | G07F 19/20 340/5.52 |
| 2013/0273968 A1* | 10/2013 | Rhoads | G06F 17/30244 455/556.1 |
| 2013/0320212 A1* | 12/2013 | Valentino | G01J 1/0488 250/336.1 |
| 2014/0022051 A1* | 1/2014 | Levien | A61M 5/20 340/5.2 |
| 2014/0143860 A1* | 5/2014 | Druckman | G06F 21/36 726/19 |
| 2014/0254896 A1* | 9/2014 | Zhou | B25J 9/0006 382/124 |
| 2015/0046198 A1* | 2/2015 | Daniel | G06Q 10/02 705/5 |

OTHER PUBLICATIONS

Written Opinion dated Sep. 30, 2015 for PCT application No. PCT/US2015/040122.
International Search report and the Written Opinion of the International Searching Authority dated Sep. 30, 2015 for PCT application No. PCT/US2015/040122.

* cited by examiner

SYSTEMS AND METHODS FOR MANAGEMENT OF MOBILE BANKING RESOURCES

This application is a nonprovisional application of U.S. Provisional Patent Application Ser. No. 62/024,310, entitled "Systems And Methods For Self-Driving Or Self-Propelled Branch Automated Teller Machines For Secure Banking Applications" and U.S. Provisional Patent Application Ser. No. 62/024,407, entitled "Systems And Methods For Predictive Resource Allocation And Location Optimization For Self Driving Bank Branch/ATMs," both filed Jul. 14, 2014. It is also related to the following U.S. Provisional patent applications: U.S. Provisional Patent Application Ser. No. 62/024,272, entitled "Systems And Methods For Transaction Pre-Fetching, Processing And Provisioning Through Intelligent Vehicle Electronic System And Back-End Cloud Infrastructure"; and U.S. Provisional Patent Application Ser. No. 62/024,398, entitled "Systems And Methods For Smart Vehicle Resident Mobile Banking Applications And Customized Biometrics Through Embedded Sensing." The disclosure of each of these provisional applications is hereby incorporated by reference in its entirety.

BACKGROUND OF THE INVENTION

1. Field of the Invention

The present invention generally relates to systems and methods for the management of mobile banking resources.

2. Description of the Related Art

Drive-through Automatic Teller Machines (ATMs) are commonly found in the United States and in other geographies. For routine banking transactions, a customer often drives to a bank, waits in the drive-through ATM queue, and, when it is his turn, conducts the transaction and is on his way.

SUMMARY OF THE INVENTION

Systems and methods for the management of mobile banking resources are disclosed.

Mobile banking resources, such as mobile ATMs, ATM Taxis, etc. may provide some or all of the following features: (1) the ability to perform banking transactions while in or in the presence of the mobile banking resource (instead of driving to a branch); cash disposal capabilities using, for example, a touch pad; (2) access to phone or video conference (using on-board cameras and microphones) communications with the branch staff and other banking resources in the vehicle. This may be in private, and the vehicle may include one-way windows, tinting (permanent and/or dynamic), etc.; (3) perform notary and other branch applications using on-board cameras, scanners, printers, etc.; (4) use on-board printers/scanners, fax machines, etc.; (5) authenticate the user using sensors in the vehicle and/or mobile device (for both first time authentication and continuing authentication) during transaction. The mobile banking resource may be equipped with variety of sensors that provide much more consistent biometric data channels than mobile devices, given noise, lighting and other characteristics. Thus, the system may be optimized for the specific conditions rather than for a generic setting.

In one embodiment, the mobile banking resource's cameras may be used to authenticate the user prior to boarding (or being given access to) the vehicle (e.g., through face recognition). In another embodiment, the mobile banking resource may authenticate the user through a mobile device (e.g., iBeacon, NFC or other communication channel) prior to the user boarding (or being given access to) the vehicle. This may be done, for example, as the vehicle approaches the user. In another embodiment, a mobile device may be used to authenticate the user before the user boards (or is given access to) the vehicle.

In one embodiment, a mobile banking resource could drive to any user location, and, like a taxicab, transport the user to another location while permitting the user to conduct ATM and/or branch transactions.

In one embodiment, the user's target location for the vehicle ride may be considered to determine the transactions that may be conducted based on the duration of the ride. In one embodiment, the user may not conduct a transaction that would take longer than the anticipated trip.

In one embodiment, the mobile banking resource may include a cash dispenser for dispensing cash (this may be refilled by using a magazine at a secure location, such as in a bank branch). It may further include teleconference and/or videoconference equipment to communicate with branch representatives, financial advisors, and others. The front screen of the vehicle may include a display. The vehicle may further include authentication capabilities, such as biometric sensors, interfaces for trusted devices, etc., to authenticate the user. This may include, for example, existing smart phone authentications and interfaces, a palm scanner, fingerprint sensor on the car door or inside, sensors (e.g., cameras) to detect face or iris biometrics, microphones to detect voice biometrics, weight sensors to detect a user's weight, etc.

Depending on user preferences and security requirements a range of authentication options may be available. For example, if the user does not want to provide biometric information for authentication, any cameras and other equipment may be disabled, and the user may instead use his or her preferred method of authentication. This may include providing an ATM card and PIN, account alias, etc.

Depending on the duration of the ride and security requirements, a user may perform sophisticated transactions, such as online investment, fund management and other types of transactions while in the vehicle.

In one embodiment, the mobile banking resources may not retain local copies of transactions and other info for security purposes.

The mobile banking resources may be brand (i.e., bank) specific, or they may serve multiple financial institutions.

The mobile banking resources may be recalled to a base station if required.

In one embodiment, the mobile banking resources may provide additional security from fraud. For example, if a mobile banking resource detects fraud or suspicious activity, it may lock its doors and transport the user to a law enforcement location. If an attempt to steal or hijack the mobile banking resource is detected, the vehicle may shut down, alert authorities, record its surroundings (e.g., video, audio, GPS), etc.

In one embodiment, all data may be encrypted for communication with back-end infrastructure, side-channel attack prevention techniques employed for maximum security.

In one embodiment, the mobile banking resources may move themselves to ATMs or branches to upload and/or exchange resources. In one embodiment, the mobile banking resources may exchange resources locally.

In one embodiment, a self-propelled, mobile transaction resource is disclosed. According to one embodiment, the self-propelled, mobile transaction resource may include an unmanned, self-propelled, mobile platform; a user interface for interfacing with a user for conducting a transaction; at least one controller that controls the movement of the mobile platform and the user interface; a communications interface for the at least one controller that communicates with a server; and a plurality of sensors that capture at least one characteristic of the user.

In one embodiment, the self-propelled, mobile transaction resource may include a banking resource in communication with the user interface. The banking resource may be an automated teller machine.

In one embodiment, the self-propelled, mobile banking resource may include a compartment for receiving a user. The compartment may be secure, and the user interface may be located within the compartment. The self-propelled, mobile banking resource may transport the user to a destination.

In one embodiment, the self-propelled, mobile banking resource may include wheels, tracks, and/or a vertical propulsion system.

In one embodiment, the unmanned, self-propelled, mobile platform may be guided remotely, or it may be autonomous.

Methods for managing a plurality of mobile resources are disclosed. In one embodiment, a method may include (1) receiving a transaction request from a user; (2) at least one computer processor determining a type of mobile resource to complete the user request; (3) the at least one computer processor determining an availability of a plurality of mobile resources of the determined type; (4) the at least one computer processor determining a location of the user and for each of the plurality of mobile resources of the determined type; and (5) the at least one computer processor dispatching one of the plurality of mobile resources of the determined type to the user based on the type of required mobile resource, the availability of the plurality of mobile resources, the available resources for the plurality of mobile resources, the location of the user, and the location of the plurality of mobile resources.

In one embodiment, the step of the at least one computer processor determining an availability of a plurality of mobile resources of the determined type may include determining resource availability for each of the plurality of mobile resources of the determined type.

In one embodiment, the mobile resource may be an unmanned, self-propelled, mobile vehicle that may include wheels, tracks, and/or a vertical propulsion system. The unmanned, self-propelled, mobile vehicle may include an automated teller machine.

Methods for conducting a transaction using an unmanned, self-propelled, mobile resource are disclosed. In one embodiment, a method may include (1) an unmanned, self-propelled, mobile resource traveling to a user location; (2) the unmanned, self-propelled, mobile resource identifying a user at the user location; (3) the unmanned, self-propelled, mobile resource authenticating the user; (4) the unmanned, self-propelled, mobile resource granting the user access to a user interface for conducting a transaction; and (5) the unmanned, self-propelled, mobile resource conducting the transaction with the user.

In one embodiment, the method may further include the unmanned, self-propelled, mobile resource periodically authenticating the user during the transaction.

In one embodiment, the step of the unmanned, self-propelled, mobile resource granting the user access to a user interface for conducting a transaction may include the unmanned, self-propelled, mobile resource granting access to a secure compartment within the unmanned, self-propelled, mobile resource.

In one embodiment, the method may further include the unmanned, self-propelled, mobile resource receiving a destination from the user; and the unmanned, self-propelled, mobile resource transporting the user to the destination.

In one embodiment, the method may further include the unmanned, self-propelled, mobile resource detecting a suspicious activity; and the unmanned, self-propelled, mobile resource initiating a first security response. If the unmanned, self-propelled, mobile resource detects continued suspicious activity following the first security response, the unmanned, self-propelled, mobile resource may initiate a second security response.

Methods for managing a plurality of mobile resources are disclosed. In one embodiment, a method may include (1) receiving a transaction request from a user at a user location; (2) at least one computer processor calculating a priority of the transaction request; (3) the at least one computer processor calculating a plurality of predicted transaction requests; (4) the at least one computer processor calculating a total priority for the transaction request and the plurality of predicted transaction requests; (5) the at least one computer processor determining future locations for a plurality of mobile resources for predicted transaction requests; and (6) the at least one computer processor dispatching a mobile resource to the user location to service the transaction request.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-7.

As autonomous and semi-autonomous vehicles become more widely available, these vehicles may be used as mobile banking resources, such as mobile automated teller machines (ATMs), branch office access, etc. For example, in one embodiment, a mobile banking resource may be provided as a taxicab, and may include features of, for example, an ATM and/or branch location. In another embodiment, one or more self-propelled, mobile banking resource (e.g., mobile ATM devices) may be deployed with or without a supporting vehicle to an area in need of ATM service.

In the context of this disclosure, the terms mobile banking resource, Mobile ATM, and ATM Taxi may be used interchangeably depending on the context.

Figure 1:
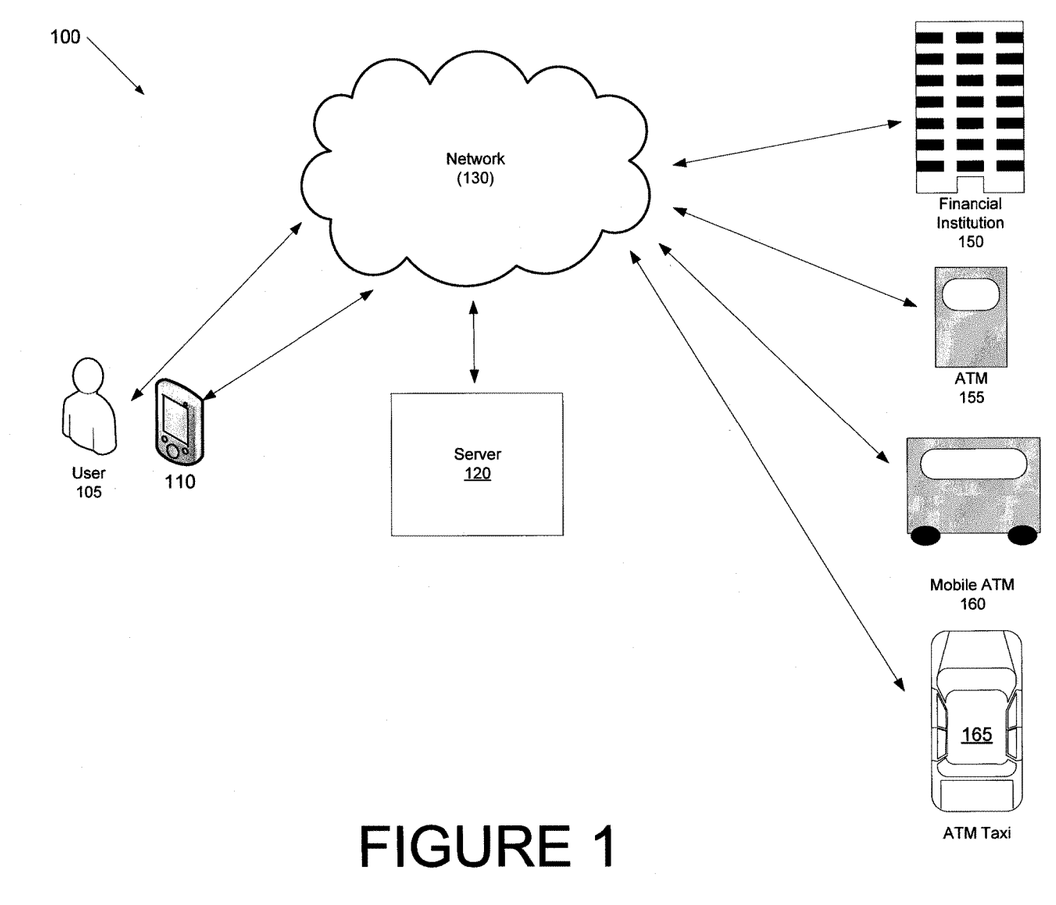
FIG. 1 is a block diagram of a system of mobile banking resources for secure banking applications related applications according to one embodiment.

FIG. 1 is an illustration of a system of mobile banking resources according to one embodiment. User 105 may communicate with network 130 via a communication device, including telephones (POTs), mobile/smart phones, tablet computers, desktop computers, notebook computers, etc. Any device that enables the user to communicate with network 130 and server(s) 120 may be used as necessary and/or desired.

In one embodiment, user 105 may be associated with mobile device 110, such as a smart phone, laptop computer, tablet computer, etc. In one embodiment, mobile device 110 may communicate with financial institution 150, ATM 155, Mobile ATM 160 and/or ATM Taxi 165 via network 130; in another embodiment, it may communicate with any or all of these elements directly using any suitable communication means (e.g., Wi-Fi, Near Field Communication, Bluetooth, IR, etc.).

Server 120 may communicate with several resources, including financial institution 150 and one or more banking resource (e.g., ATM 155, Mobile ATM 160 and ATM Taxi 165). In one embodiment, financial institution 150 may include one or more branch locations including tellers, financial advisors, and other bank personnel.

In one embodiment, server 120 may manage the availability, deployment, and resupply of mobile banking resources (e.g., Mobile ATM 160 and/or ATM Taxi 165). Server 120 may further manage the partitioning and/or provisioning of a transaction request from user 105.

In one embodiment, ATM 150 may include ATMs at branch locations and other facilities (e.g., supermarkets, kiosks, etc.). Mobile ATM 160 may include individual self-propelled, self-driving ATMs that may be deployed, manually or automatically, to different locations. Mobile ATM 160 may further include a plurality of ATMs that may be deployed together with a support vehicle such as a van, a truck, trailer, etc.

In one embodiment, Mobile ATM 160 may "drive" to its destination autonomously without human control similar to self-driving vehicles. In another embodiment, Mobile ATM 160 may be remotely controlled by a human. In another embodiment, a combination of autonomous and human control may be used as desired.

In another embodiment, Mobile ATM 160 may be part of, or provided by, an airborne drone. For example, and airborne drone may be used to deliver documents, money, lockbox contents, etc. as necessary and/or desired.

ATM Taxi 165 may include manned and unmanned vehicles that may include ATM and other banking services, and may transport a user from a first location to a second location. In one embodiment, ATM Taxi 165 may be a self-driving, autonomous vehicle. In another embodiment, ATM Taxi 165 may be remotely controlled by a human. In another embodiment, a combination of autonomous and human control may be used as desired.

In another embodiment, ATM Taxi 165 may provide an enclosed area in which a user may conduct banking and other business in private. In other words, ATM Taxi 165 does not need to transport a user to a second location.

For example, in one embodiment, a user may request ATM Taxi 165 to take him or her to the mall, and the user may conduct a banking transaction while being transported to the destination. In another embodiment, ATM Taxi 165 may pick up the user and transport him or her to a branch location. While en route, the user may conduct banking transactions, stage transactions, or conduct other business.

In one embodiment, ATM Taxi 165 may serve a single customer at a time. In another embodiment, ATM Taxi 165 may serve more than one customer at a time. For example, ATM Taxi 165 may have more than one compartment or area for conducting transactions.

As noted above, Mobile ATM 160 and ATM Taxi 165 may provide banking services. For example, Mobile ATM 160 and ATM Taxi 165 may include a cash dispenser, video and/or audio conferencing equipment, scanners, printers, etc. They may communicate with user 105's mobile device 110 using any suitable communication means, such as Near Field Communication, Bluetooth, Wi-Fi, IR, wired communication, etc. In one embodiment, it may further include charging/communications interfaces for mobile devices (e.g., USB ports, Lightening chargers, inductive chargers, AC power sources, 12-V outlets, etc.).

In one embodiment, Mobile ATM 160 and ATM Taxi 165 may provide user 105 with Internet access via a graphical user interface in Mobile ATM 160 and or ATM Taxi 165, or by a wireless or wired connection to mobile device 110. In one embodiment, Mobile ATM 160 and ATM Taxi 165 may further provide user 105 with news, stock prices, etc.

Mobile ATM 160 and ATM Taxi 165 may further comprise equipment to authenticate the user, including cameras, biometric sensors, keypads, touch screens, etc. In one embodiment, Mobile ATM 160 and ATM Taxi 165 may authenticate user 105 using, for example, face recognition, fingerprint recognition, etc. before user 105 is permitted to enter ATM Taxi 165.

In one embodiment, on-board authentication may continue using, for example, voice recognition, signature or other behavioral biometric-based authentication, iris recognition, etc. In one embodiment, existing authentication, or additional authentication, from a user's mobile phone or other trusted personal device may be factored into the authentication process. Authentication may be an independent security process as well as continuous monitoring process that may run in the background while the user is performing a transaction. For each transaction, the security requirements may be determined and the user may be taken through the appropriate authentication processes using onboard and other available resources.

Due to their mobility, Mobile ATM 160 and ATM Taxi 165 may include security features. For example, ATM Taxi 165 may lock its doors and transport the user to a law enforcement location if fraud, or an attempt to hijack or vandalize is detected. In another embodiment, if an attempt to steal or hijack Mobile ATM 160 and ATM Taxi 165 is detected, the vehicle may shut down, alert authorities, record its surroundings (e.g., video, audio, GPS), deface any currency (e.g., stain money with ink similar to a dye pack), etc.

In one embodiment, the security systems for Mobile ATM 160 and ATM Taxi 165 may determine the risk profile for the transaction as well as the location and may adjust security features accordingly and dynamically. For example, the security level and/or services provided may vary depending on the time of the day, location driven, proximity to risky regions, user and transaction profiles etc. For example, Mobile ATM 160 and ATM Taxi 165 may require additional security or may not travel to a high-crime area, or an area in which there have been past security issues with Mobile ATM 160 or ATM Taxi 165.

In one embodiment, some or all data that is communicated from Mobile ATM 160 and/or ATM Taxi 165 may be encrypted for communication with back-end infrastructure, side-channel attack prevention techniques employed for maximum security.

Figure 2:
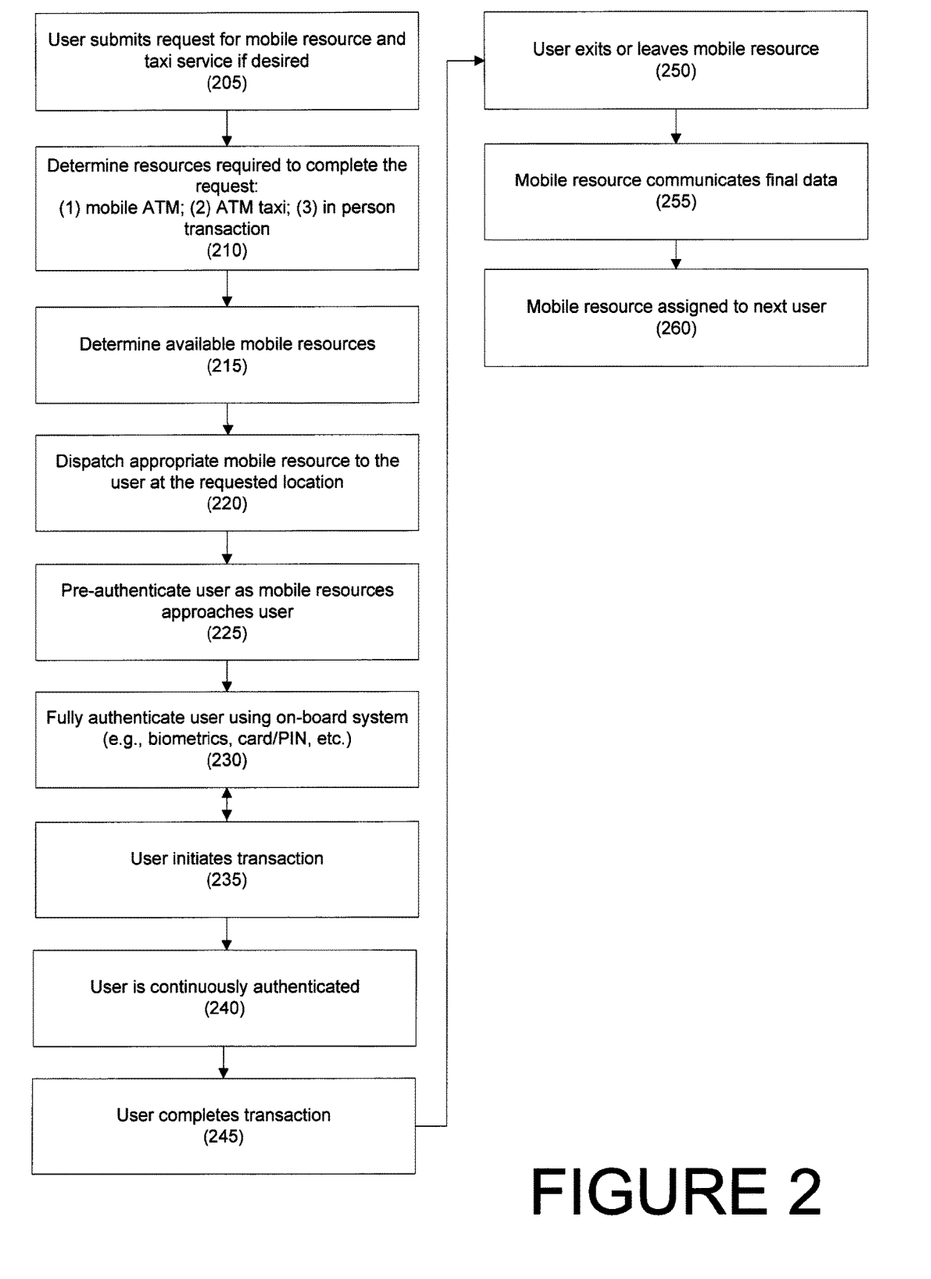
FIG. 2 is a flowchart depicting a method for using mobile banking resources for secure banking applications related applications according to one embodiment.

FIG. 2 depicts an exemplary method for managing mobile banking resources, such as Mobile ATMs and ATM Taxis. In step 205, a user may submit a request for a mobile banking resource, such as a Mobile ATM or an ATM Taxi, discussed above. In one embodiment, the user may submit his or her location automatically (e.g., based on a GPS location from the user's mobile device), or the user may specify a location to "meet" the mobile banking resource. The user may also request a specific time (e.g., now, as soon as possible, 3 hours from now, 5:00 PM, etc.). In one embodiment, if an ATM Taxi is requested, the user may also specify the destination for the trip.

In step 210, the financial institution may receive and analyze the user's request. In one embodiment, the request may be analyzed to determine what mobile banking resources are required to complete the request. For example, a determination is made whether the request requires a Mobile ATM, an ATM Taxi, or whether the request needs to be completed in person.

In one embodiment, the user may be informed of any nearby mobile banking resources if they are available. For example, if the user requested a mobile ATM, and the user is one block away from a branch location with an ATM, the user may be informed of such and directed to this resource.

In one embodiment, the financial institution may use a back-end server to analyze and manage the financial institution's mobile banking resources.

In step 215, the financial institution may determine what resources are available to complete the request. For example, a status of the branch locations, fixed ATMs, Mobile ATMs, and ATM Taxis may be retrieved, along with the resources and/or funds available in the mobile units, the power/fuel available to the mobile units, the location of the mobile units, any future commitments for the mobile units, environmental conditions (e.g., time of day, weather, traffic, etc.), anticipated needs, etc.

In step 220, an appropriate mobile banking resource may be dispatched to the requested location. The user may be sent a message informing the user of the dispatch, and may be provided with real-time (or close to real-time) information regarding the location of the mobile banking resource, the expected arrival time, etc.

In one embodiment, the system and/or the mobile banking resource may monitor alert notifications (e.g., police scanners, etc.) to determine the risk of traveling to the user's location. Both positive and negative information may be acquired from a variety of sources. Positive events/signals such as concerts, sports events, etc. (which may include events where cash or ATM demands may increase) may result in proactive placement of mobile banking resources. Negative events/signals, such as police activity, riots, etc. may result in mobile banking resources avoiding those areas, or ensuring that the mobile banking resources that are deployed have adequate security features.

In one embodiment, mobile banking resources may be proactively deployed to locations where current ATMs are low on resources, out of order, etc.

In one embodiment, if necessary, the mobile banking resource may visit a branch location, a resupply center, etc. if it is low on resources. In another embodiment, two mobile banking resources may rendezvous and reallocate resources as necessary and/or desired.

In step 225, the mobile banking resource may pre-authenticate the user as it approaches the user. In one embodiment, the mobile banking resource may detect the location of the user's registered mobile device. For example, the user's mobile device may transmit a beacon or other identifier for the mobile banking resource.

In another embodiment, the mobile banking resource may use an on-board camera to recognize the user's face. For example, face recognition-based authentication using onboard cameras, voice recognition using microphones, finger or palm printing based biometric authentication using finger/palm scanners, iris biometrics using iris scanners, behavioral and multimodal biometrics using multiple channels such as video (e.g., motion biometrics), or using full or partial authentication from users mobile devices, passwords, or any combination of these, may be used as necessary and/or desired.

In one embodiment, pre-authentication may be optional.

In step 230, the user may be fully authenticated. In one embodiment, the user may present an ATM card, credit card, etc. and may enter his or her PIN.

In one embodiment, when the user enters or accesses the mobile banking resource, a personalized profile for the user may be loaded, with preferred settings for the vehicle, security and privacy features, etc. For example, one user may select to have streaming stock market data to be presented while conducting transactions, while another may not. Similarly, one user may require stricter security and authentication features for account access, while another may not. Some users may require direct communication with human/customer service support, while others may not. Any sort of preferences may be retrieved as available, necessary and/or desired.

Once the user is authenticated, in step 235, the user may initiate a transaction. In one embodiment, if using a Mobile ATM, the user may simply start using the ATM. If using an ATM Taxi, the user may enter the vehicle, confirm the destination, and initiate the transaction.

In one embodiment, in the ATM Taxi, the user may use on-board videoconferencing equipment, printers, scanners, Internet connection, etc. Thus, the ATM Taxi may function as a mobile office.

In one embodiment, the user may be presented with an estimate of the time remaining on the trip to aid the user in conducting the transaction.

In one embodiment, the doors on the ATM Taxi may be secured so that no one may enter the vehicle during the trip. In one embodiment, if the ATM Taxi senses that a door was opened, or any other suspicious activity has occurred, the authenticated session may be terminated.

In step 240, the user may be continuously authenticated and monitored. For example, the user's movement and other behavioral biometrics may be monitored and/or recorded.

In step 245, the user may complete his or her transaction, and, in step 250, may exit or leave the mobile banking resource. If using a Mobile ATM, the user may simply walk away from the Mobile ATM, thereby terminating the session. If using the ATM Taxi, the user may remain in the vehicle until the destination is reached.

In one embodiment, if it is determined that the user needs to complete some or all of the transaction in person, the user may be given an opportunity to be transported to a branch location.

In step 255, the mobile banking resource may communicate the final data on the transactions to the financial institution. In one embodiment, the mobile banking resource may not store any records of the transaction locally.

In step 260, the mobile banking resource may be assigned to the next user, may be replenished, or may be used by a walk-up customer. In one embodiment, the next action may be pre-scheduled.

Figure 3:
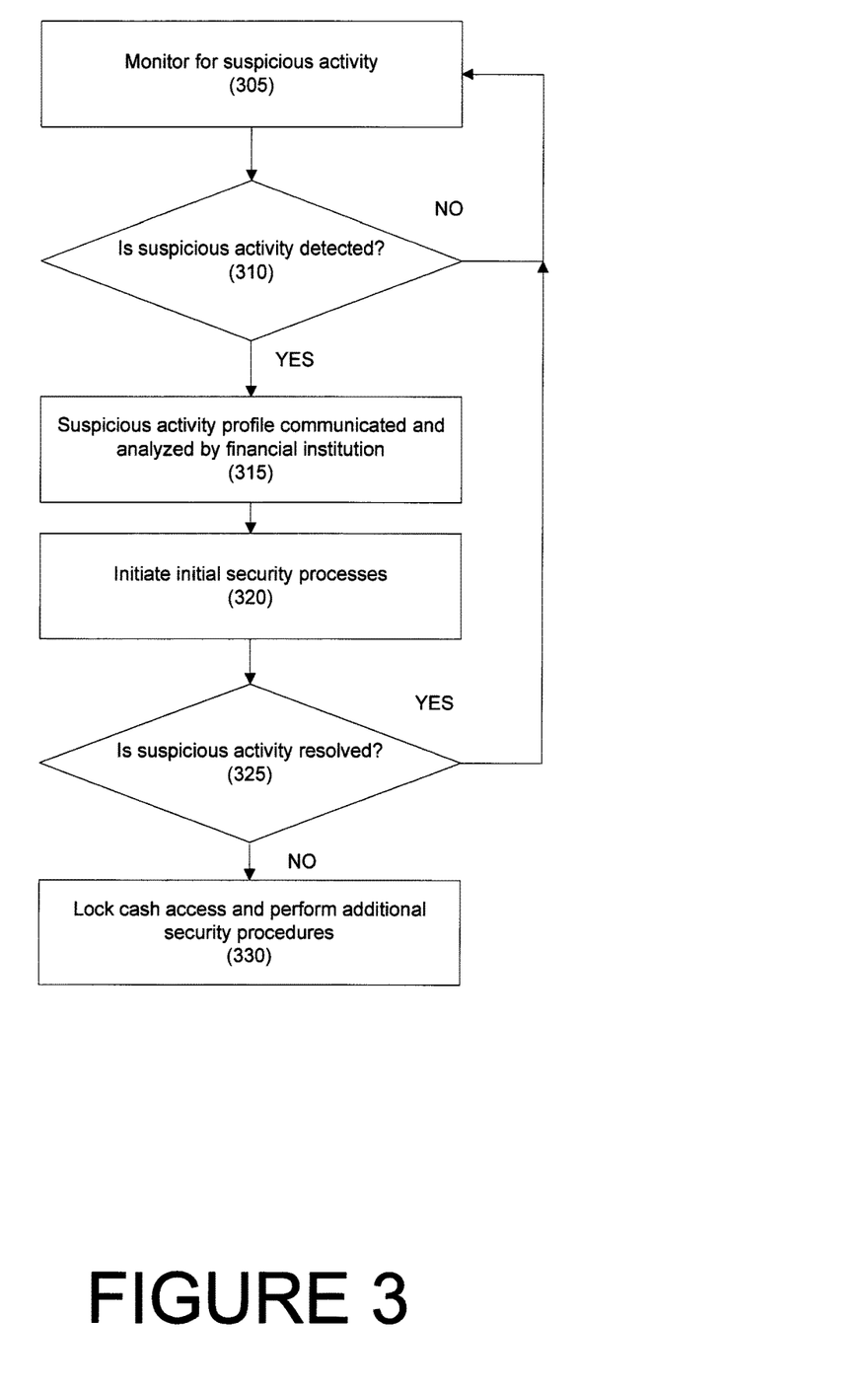
FIG. 3 is a flowchart depicting a method for detecting suspicious activity involving mobile banking resources according to one embodiment.

A potential risk involved with mobile banking resources is the risk that the mobile banking resource will be "hijacked," vandalized, disabled, used to facilitate fraudulent transactions, etc. In one embodiment, while deployed, the mobile banking resources may be constantly monitored for these sort of suspicious activities. Referring to FIG. 3, an exemplary method for monitoring and addressing suspicious activity is disclosed.

In step 305, the mobile banking resource may be monitored for suspicious activity. In one embodiment, the mobile banking resource may self-monitor itself; in another embodiment, the mobile banking resource may be centrally monitored by a back-end server. In still another embodiment, the mobile banking resource may be monitored by a third party, such as a security agency. For example, after some inherent security thresholds are reached/passed, mobile banking resource may be monitored by both computerized and human security functions. In one embodiment, a combination of self-monitoring, centralized monitoring, and/or third party monitoring may be used as necessary and/or desired.

In step 310, if suspicious activity is detected, a suspicious activity profile may be communicated to the financial institution in step 310. Examples of suspicious activity include a user trying to log on to unauthorized systems of the vehicle through Wi-Fi or some other form connection, attempting to vandalize the mobile banking resource, attempting to disable on-board security cameras, etc. The information provided to the financial institution may include several types of data, including the user's profile, last session detail, security camera and other data from the vehicle, suspicious activity summary (e.g., trying to use alternative channels to communicate, trying to intercept communications, etc.), trying to use somebody else's card, identification, other activities against regulations etc. The financial institution may analyze the suspicious activity profile to determine the threat or risk to the mobile banking resource.

In step 320, the mobile banking resource may initiate initial security processes. In one embodiment, for a Mobile ATM, this may include disconnecting and/or terminating any secure sessions, turning off a video interface, locking the cash dispenser, activating additional cameras and/or microphones, live streaming audio/video, etc. For an ATM Taxi, this may also include locking the doors to prevent exit or entry, etc.

In one embodiment, the mobile banking resource, financial institution, and/or the third party may alert the authorities of any potential suspicious activity.

In step 325, a second check may be made to determine if the suspicious activity has been resolved. If it has, the user may need to re-authenticate himself (or herself) in order to conduct the transaction.

If the suspicious activity has not been resolved, in step 330, additional security measures may be taken. This may include, for example, returning the Mobile ATM to a secure location, securing the cash dispenser, inserting a dye pack with the cash, etc. Alternatively, the Mobile ATM may be disabled and prevented from moving.

In an ATM Taxi, the doors may be secured, the cash dispenser locked, dye packs deployed, etc. In addition, the user may be transported to a secure area (e.g., if the suspicious activity was from outside the vehicle) or to the authorities (e.g., if the suspicious activity was from within the vehicle).

In one embodiment, if the mobile banking resource is disabled (e.g., flat tire, engine issues, etc.) or prevented from moving (e.g., surrounded), it may automatically call for backup banking and security resources as well as the police. The recording facilities such as video cameras, microphones, additional lighting, etc. may be activated to protect the user and the mobile banking resource.

In one embodiment, a system and method for predictive mobile banking resource placement is disclosed. In one embodiment, the system and method may optimally allocate the mobile banking resources, for example, in a metropolitan area, to maximize the efficiency of the ATM network In one embodiment, user data may be collected from, for example, mobile devices, including those having a mobile application installed thereon. Examples of such applications include mobile banking applications. The mobile applications may provide user location information (both for a specific user and users in general), transaction preprocessing data, user movement patterns, etc. For ATM Taxis, the data may further include user's potential destinations which may be based on historical data. The system may use metric-based evaluation of the associated individual components. The proposed system may also incorporate machine learning based on user experience, post-service evaluation of the resource allocation and using other feedback information.

In one embodiment, the system and method may collect requests for mobile banking resources (e.g., Mobile ATMs, ATM Taxis), branch usage data (e.g., length of ATM queues, ATM resources available, etc.), event data (e.g., sporting events, conferences), transit status (e.g., traffic, mass transit delays), weather information (e.g., rain, sun, snow, etc.), and may spatiotemporally analyze patterns. The solution may then optimally allocate mobile banking resources, including Mobile ATMs and ATM Taxis, to the requesting users based on the user locations and the resource location and availability.

In one embodiment, the system and method may also consider the user's transaction requirements (e.g., whether the request should be conducted in an ATM Taxi, in person, etc.), detailed user profile information (e.g., the user's sensitivity to delay, required security level, ability to authenticate the user remotely, etc.), the target destination for the taxicab ride, the frequency of requests locally/globally, and the availability of cabs in the various zones across the area of interest.

In one embodiment, the mobile banking resources may carry variable amounts of cash or other resources. The requested dollar amount may be considered so that a mobile banking resource with insufficient funds is not dispatched to a user.

In one embodiment, the mobile banking resources may transfer cash or other resources among themselves at branches or other trusted locations when deployed. The rider may or may not accompany the vehicle.

In one embodiment, the system and method may further predictively place or route mobile banking resources to locations based on the activity profiles of the users, general activity patterns for a region (e.g., concerts, sporting events, conferences, etc.), weather, traffic, historical data, natural disasters, etc.

In another embodiment, ad-hoc cab allocation and resource queuing for local mobile banking resources may be used. For example, mobile banking resources may receive requests using local data transmission such as iBeacons, Near Field Communication (NFC), or other local communication technology. As a result, the mobile banking resources may only receive requests from within its immediate proximity (e.g., within a few blocks of its location).

In this embodiment, as the mobile banking resources may not have access to the global allocation/distribution center, they may exchange requests in their queues with other mobile banking resources in the proximity.

In one embodiment, optimization algorithms may be used to self-relocate the devices to areas where more demand for mobile banking resources is anticipated. This may consider branch locations, other ATM locations, etc. in the area and look for opportunities to intersect anticipated demand for mobile banking resources.

During a communication (e.g., phone, video conference, etc.) with a branch representative, if the customer chooses, the ATM Taxi may drive the user directly to the branch.

The mobile banking resources may drive itself to a pre-designated depot for cash recycling and other cash/resource related service and management.

The mobile banking resources may augment existing network of static ATM's when there are sudden demand peak by driving to the location to provide volume relief.

The mobile banking resources may have network level intelligence to know how many additional mobile ATM resources are needed to support demand and may know to be dispatched.

The mobile banking resources may act as a standalone ATM based on pre-configured rules and algorithms, and may act as a self-locating ATM.

The mobile banking resources may have extra security elements, for example, video cameras, speakers, communication devices, etc. and may be able to summon law enforcement, or even drive a suspicious person to law enforcement.

Figure 4:
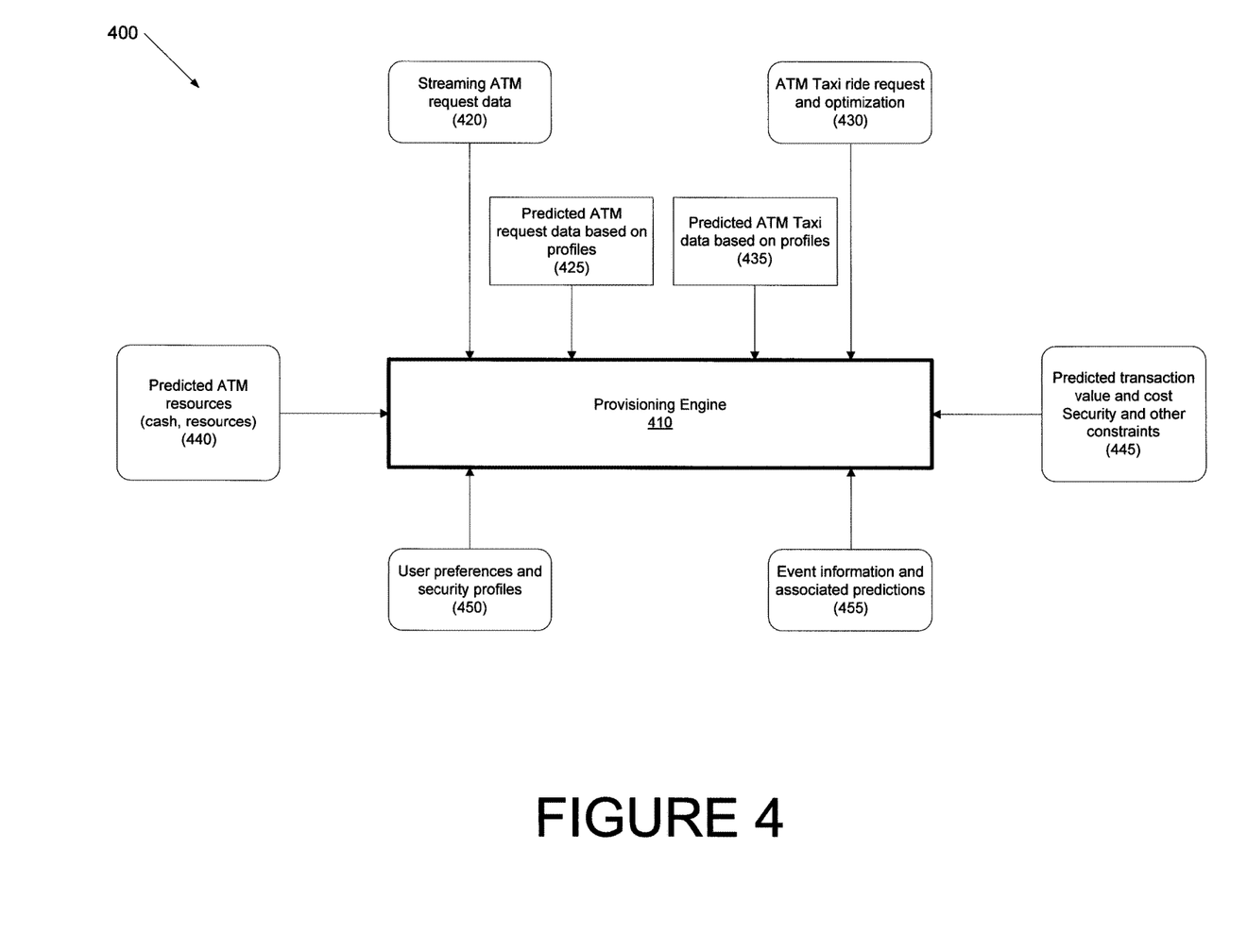
FIG. 4 depicts a system for predictive mobile banking resource allocation is disclosed according to one embodiment.

Referring to FIG. 4, a system for predictive mobile banking resource allocation is disclosed according to one embodiment.

System 400 may include provisioning engine 410. Provisioning engine 410 may comprise a server, or a number of servers, that receive various inputs and proactively allocate, assign, or deploy mobile banking resources.

Provisioning engine 410 may receive several inputs, including, for example, Mobile ATM request data 420 and ATM Taxi requests 430. In one embodiment, predicted Mobile ATM request data 425 and predicted ATM Taxi request data 435 may be considered. The predicted requests may be based on, for example, profiles, historical data, etc. based on the time of day, day of the week, etc.

Provisioning engine 410 may further receive predicted ATM resource data 440. In one embodiment, this may be a prediction of the resources that will be requested at a given time, within a certain time period, etc.

In one embodiment, provisioning engine 410 may look not only at existing requests, but also at predicted requests, predicted resources, etc. in order to optimize the outcome.

Provisioning engine 410 may receive a predicted transaction value and cost, as well as security and other constraints 445. For example, in one embodiment, the user may start the transaction on a mobile banking resource and the transaction information can be used to prioritize the request. If, for instance, the user needs private, secure environment and access to a financial advisor to finalize a high priority transaction, that information is factored into the system.

Provisioning engine 410 may receive user preferences and security profiles 450. In one embodiment, the user preferences and security profiles 450 may be retrieved only for users making requests.

Provisioning engine 410 may also receive event information and associated predictions 455. In one embodiment, real-time data regarding traffic, weather, events, etc. may be considered in order to predict resource requests.

In one embodiment, metric-based ranking of incoming requests and assignment of resources are disclosed. The metrics may include a request priority, serviceability of the request, etc.). An example metric function M may be defined by the equation:

$$M=C1*Serviceability+C2+User\ Priority+C3*Request\ priority+C4*Resource\ Requirements\ Match-as\ well\ as\ other\ functions\ depending\ on\ the\ custom\ use\ case$$

$C1, C2, C3, \ldots CN$ represent the coefficients that may be set by, for example, the SLA (Service level agreement), Institutional Policies, dynamic coefficients determined by run time information (e.g., location of the vehicle, user, etc.)

Where Serviceability is a function of:

$$S(t)=CS1*Users\ proximity\ to\ Resource\ Vehicle+\\ CS2*Transaction\ Characteristics\ metric+\\ CS3*Regional\ Demand\ match\ at\ estimated\ destination\ at\ (t+N)+CSN* \ldots$$

where <CS1-N> may be the dynamically adjusted/run-time coefficients determined by the system parameters and incoming data.

Similarly User Priority is a metric that may indicate the priority level a user might have in accessing resources. Request priority may be a metric of how important the transaction requested in the incoming request queue this might include time sensitivity of the user's transaction profile, etc.

In one embodiment, both user and request priorities may be affected by SLAs.

Resource requirements match is a metric that may indicate how suited the system instance (e.g., the mobile banking resource) is for performing the transaction from a resource requirement perspective. It may, for example, be expressed as a coefficient in the range of [0-1].

The requests may be received using streaming data, and may include real-time transaction requests that require branch/ATM, and may identify the transaction value, security level, resource requirements, etc. They may include pre-fetched and predicted transactions (near future transaction load predictions). Detailed user profiles for each request (users delay sensitivity, security requirements, other profile info, etc.) may be considered. If it is a Mobile ATM or ATM Taxi request, the target destination may be considered. The frequency of requests local/regional may be considered. The availability (both geographical proximity, resource (e.g., cash, videoconference ability, etc.), etc.) and cost for ATM Taxi requests may be considered. The existence and wait times at existing ATM/Branch locations may be considered. Event data (e.g., concerts, sporting events, daily/weekly population movement, and traffic profiles, mass transit status, conferences, etc.) may be considered.

Techniques to predict time "t+1" map for the resources and optimize resource allocation for next time slot are disclosed. For example, if a Mobile ATM or ATM Taxi is requested for a high demand location like mid-town New York City, resources may be allocated accordingly. If the request is for a trip to a remote location where there may not much return activity, a regular cab may be suggested, requested, etc.

Figure 5:
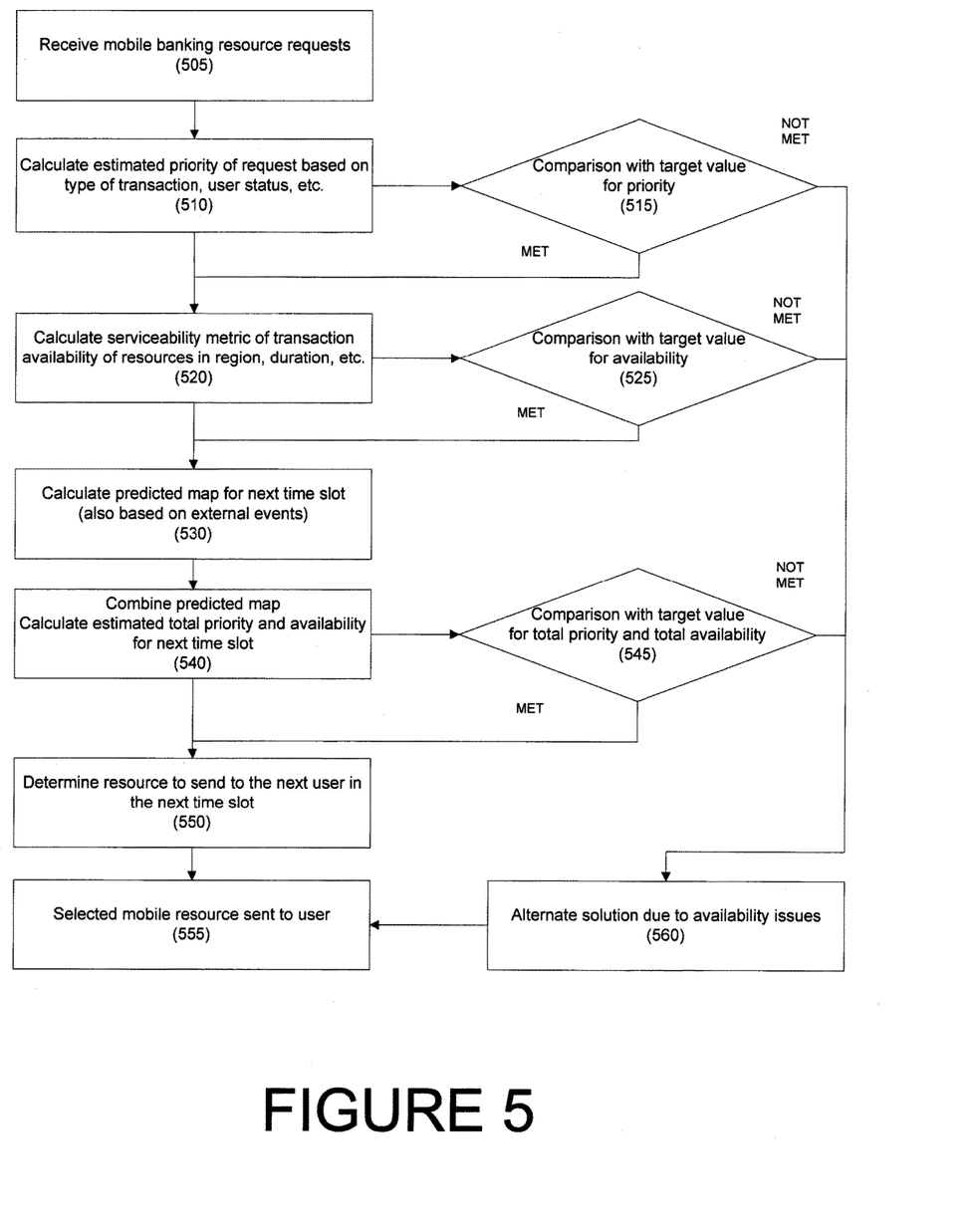
FIG. 5 is a flowchart depicting a method for predictive mobile banking resource placement according to one embodiment.

Referring to FIG. 5, an exemplary method for predicted mobile banking resource placement is disclosed. In step 505, mobile banking resource requests are received. In one embodiment, the requests may be for Mobile ATM resources and ATM Taxis. In addition, the requests may be for banking resources that may not be mobile, such as at a branch location, but the ATM Taxi or another vehicle may pick up the customer and drive the customer to that resource.

In step 510, the incoming requests may be evaluated and assigned a priority. In one embodiment, the priority may be based on, for example, the type of transaction requested, the user status (e.g., a preferred customer or non-preferred customer), proximity to resources, proximity to alternative banking resources (e.g., other banks), etc.

In step 515, the calculated priority may be compared to a target value for priority. The optimization function may vary the target value depending on the goal or goal. For example, in one embodiment, the financial institution may try to optimize for customer satisfaction, where the servicing of all requests are scheduled for minimum delay as well as taking user sensitivity for delay into account. In another embodiment, such as in high demand, limited resource cases, as the number of users demanding services exceed the available capacity other optimization may be performed, such as volume of the transaction, deadline or time sensitivity of the transaction etc. The system may dynamically vary the optimization criteria.

In step 520, a serviceability metric for the transaction may be calculated. In one embodiment, the serviceability metric may vary depending on the location of the user (e.g., rural vs. in a city), the location of the mobile banking resources, the nature of the transaction, etc.

In step 525, the calculated serviceability metric may be compared to a target serviceability metric. In one embodiment, the target serviceability metric may be set by the financial institution based on its goals for customer service. It may also be based on system specifications, security requirements, etc.

In step 530, a predicted map for a next time period may be calculated. In one embodiment, the mobile banking resource may have arrived at the location, and the user's transaction may be complete. In one embodiment, a user may input a target destination when requesting the mobile banking resource. As a result, the mobile banking resource's next free time slot can be predicted for the predicted arrival time. If another user in the area is also requesting a mobile banking resource, the proposed map can highlight that this next user can be effectively serviced at this next time slot.

For example, a list of active and available Vehicles $\{V_1, V_2, \ldots V_N\}$ and Users $\{U_1, U_2, \ldots U_M\}$ at time instant or time slot t1 may be determined. A demand calculation may be made for next time slot $t1+\Delta$ based on, for example, the behavior pattern over a period of time. For cases below a predetermined threshold Th1 of periodicity (e.g., P<Th1), auto regressive moving average modeling may be used; for cases above the predetermined threshold of periodicity (P>Th1) may be calculated based on the periodicity.

In one embodiment, the target mobile request destinations may be input into the system for the corresponding t1+t (Duration of service), while marking the end location requested by the user. The availability of local and total resources may then be compared to the predicted local and total demand for the corresponding time slots.

In one embodiment, the algorithm may attempt to maximize the gap weighted gap between the resource availability and resource demand for the next N time slots. The technique may be customized for other optimization goals using the same infrastructure for various embodiments.

In one embodiment, external events, such as traffic information, weather, events in the area, historical data (e.g., historical traffic, historical request data, etc.) may be considered in calculating the predicted map for the next time period.

In step 540, the predicted map may be combined with the current map, and the estimated total priority and estimated availability of resources for the next time slot may be calculated. In one embodiment, the "total priority" may estimate the priority for all requests for an area, such as a geography, a service area, etc.

In step 545, the total priority and total availability for the next time slot may be compared to a target value for total priority and total availability.

In step 550, the system may determine the banking resource to send to the next request in the queue. For example, the system may determine where the banking resource is likely to be sent following completion of the current request. In step 555, the mobile banking resource is sent to service the current request.

Figure 6:
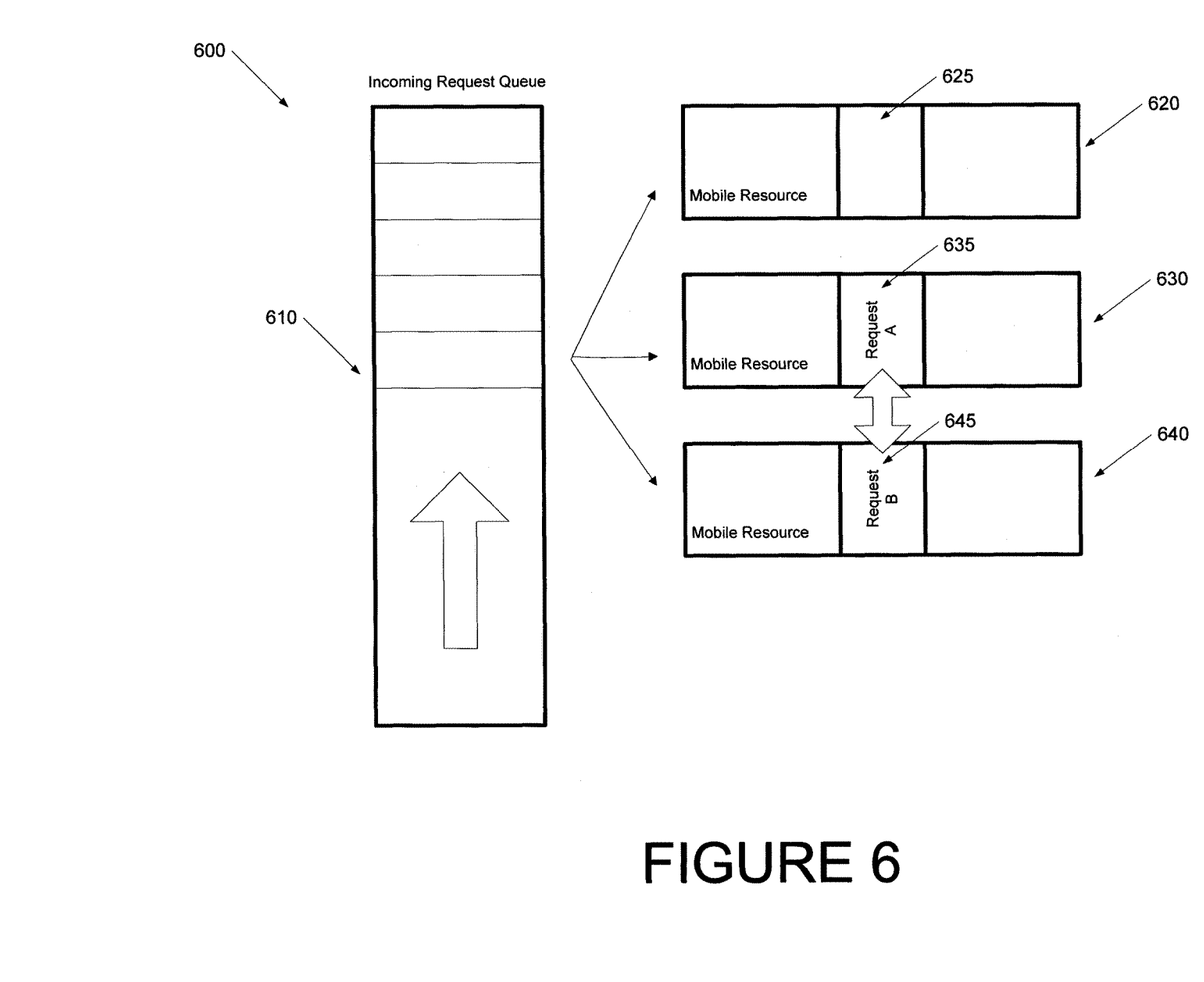
FIG. 6 is process flow depicting an ad hoc approach for locating resources according to one embodiment.

Referring to FIG. 6, in another embodiment, an ad hoc approach may be used for locating resources. For example, as requests are received by incoming request queue, the requests are processed to provide the requested resource (e.g., mobile resource 620, 630, 640) as quickly as possible. In one embodiment, the process may be decentralized so that a request may be routed to available resources (e.g., mobile resource 620, 630, 640), and the resources (e.g., mobile resource 620, 630, 640) may communicate with one another to determine which is closest and has the required resources.

In step 560, if any of the target values for priority (step 515), availability (525), and total priority and total availability (step 545) are not met, an alternative solution may be determined. In one embodiment, if an alternative solution is determined, then resources may be allocated to other users. In one embodiment, the alternative solution may be determined by considering, for example, predetermined values and real-time demand data.

Referring to FIG. 6, an exemplary system 600 for ad hoc mobile banking resource placement is disclosed. In system 600, incoming requests for resources may be received by incoming request queue 610. In one embodiment, the incoming request queue 610 may be a first in, first out queue. In another embodiment, certain requests may be given a higher priority than others based on, for example, customer status, etc. In still another embodiment, the requests may be assigned based on the closest resource.

In one embodiment, the user may be assigned the nearest available resource (e.g., mobile resource 620, 630, 640) prior to servicing the request while in the queue.

In one embodiment, resources (e.g., mobile resource 620, 630, 640) may swap, exchange, trade, or assign queue entries if, for example, it is more efficient, if resources are unavailable, etc. For example, in FIG. 6, mobile resource 630 may determine that it does not have sufficient resources to conduct Request A that is in mobile resource 630's queue, and may coordinate with mobile resource 640 to swap Request A with mobile resource 640's Request B. This may reduce the central control and any associated bottleneck in the system.

A plurality of mobile banking resources 620, 630, and 640 may be provided. Mobile banking resources 620, 630, and 640 may include Mobile ATMs, ATM Taxis, etc.

Each mobile banking resource 620, 630, and 640 may include its own request queue 625, 635, and 645. As requests exit incoming request queue 610, they are transmitted to one, more than one, or all mobile banking resources 620, 630, and 640. Mobile banking resource 620, 630, and 640 may independently claim a request based on availability, resources, location, etc. and may communicate that to the other mobile banking resources.

In another embodiment, a request may be transmitted from incoming request queue 610 to one mobile banking resource 620, 630, and 640 based on, for example, the closest resource to the request. For example, in FIG. 6, mobile baking resource 630 received a request from incoming request queue 610.

If the selected mobile banking resource cannot service the request because, for example, despite being the closest resource, it does not have sufficient resources, it may transfer or exchange the request to another mobile banking resource. In FIG. 6, mobile banking resource 630 has transferred a request to mobile banking resource 640 because mobile banking resource 630 did not have sufficient resources.

Figure 7:
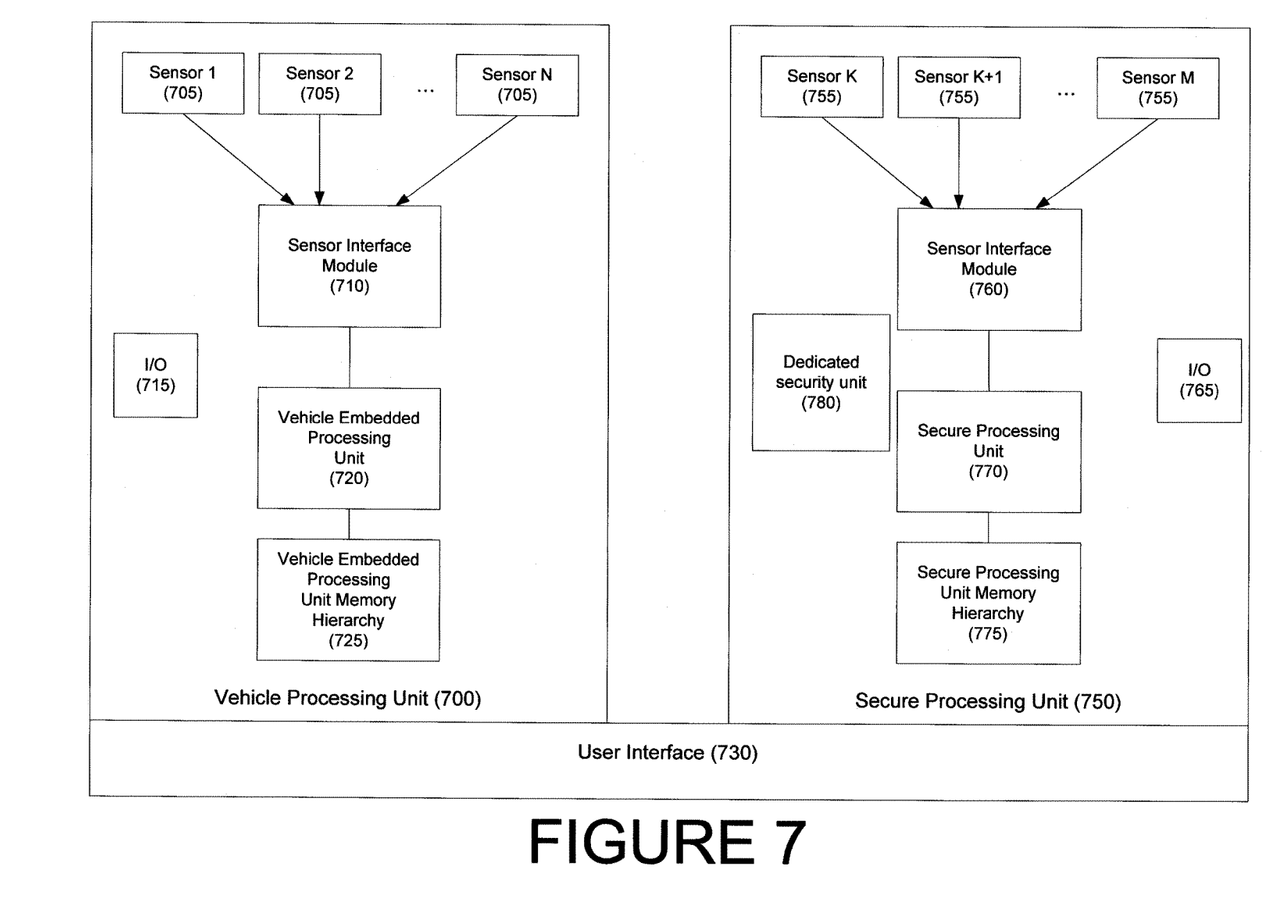
FIG. 7 illustrates an intelligent vehicle system and a secure processing system according to one embodiment.

Referring to FIG. 7, an intelligent vehicle system and a secure processing system according to one embodiment is illustrated. In FIG. 7, secure processing applications may be processed in secure processing unit 750, independent of the vehicle processing system unit 700. In one embodiment, secure processing unit 750 may be part of the vehicle system. In one embodiment, the data paths and communication paths for embedded secure processing unit 750 are fully encrypted.

In one embodiment, vehicle processing unit 700 may receive input sensor data from a wide range of sensor devices (e.g., one or more sensor 705) such as those discussed above. Sensor(s) 705 may send the collected data to sensor interface module 710), which may include, for example, analog-to-digital converters, amplifiers, etc. Sensor interface module 710 may interface with vehicle embedded processing unit 720, which receives and processes input data from sensors, user interfaces, etc. Vehicle processing system 700 may also include vehicle embedded processing unit memory hierarchy 725 that may store the data across various cache, memory or non-volatile memory units. The communication path of the processing unit 700 may be independent of the processing path in secure processing unit 750.

In one embodiment, input/output (I/O) 715 and 765 may be independent due to encryption and higher security processes.

Secure processing unit 750 may be a dedicated processing unit that handles high security application data for the vehicle systems, such as financial applications, medical applications, etc. The data in secure processing unit 750 may be fully encrypted both in flux and at rest in storage hierarchy 775. In one embodiment, a plurality of sensors (e.g., one or more sensor 755) may be used. For example, for high security applications, sensor(s) 755 may include image capture devices/sensors, motion sensors, pressure sensors, microphones, etc. for various biometric and other authentication techniques (such as iris recognition, voice recognition, face recognition, motion and other behavioral biometrics etc.). The data from sensor(s) 755 may be converted and processed at sensor interface module 760, which, like sensor interface module 710, may include analog-to-digital converters, amplifiers, etc.

In one embodiment, although the encryption stages are not illustrated, it is notable that all data may be protected within secure processing unit 750. In addition, secure processing unit 750 may also provide data encryption at rest.

In one embodiment, some or all external communication paths to/from secure processing unit 750 may be encrypted. In one embodiment, secure processing unit 750 may include a dedicated communication interface, such as an antenna.

In one embodiment, secure processing unit 750 may include dedicated security unit 780 that may provide secure data analysis and may disable secure processing unit 760 if any anomalies or threats are detected. Threat and anomaly profiles and models are stored in dedicated security unit 780.

In one embodiment, the user may interface with vehicle processing unit 700 and/or secure processing unit 750 using user interface 730.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized computer processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A self-propelled, mobile transaction resource comprising:
   an unmanned, self-propelled, mobile platform comprising:
      a motor;
      a plurality of wheels or tracks driven by the motor; and
      a power supply that powers the motor;
   a user interface comprising a screen and a user input device for interfacing with a user conducting a transaction;
   at least one controller that controls the movement of the mobile platform and the user interface;
   a communications interface for the at least one controller that communicates with a server; and
   wherein the communications interface receives customer demand data for the mobile transaction resource from the server, the customer demand data representing demand for the mobile transaction resource from a plurality of customers of the mobile transaction resource at a plurality of customer locations; and
   the at least one controller determines one of the plurality of customer locations for the unmanned, self-propelled, mobile platform based on the customer demand data, and controls the motor to move the unmanned, self-propelled, mobile platform to the determined customer location.

2. The self-propelled, mobile transaction resource of claim 1, further comprising:
   a banking resource in communication with the user interface.

3. The self-propelled, mobile transaction resource of claim 2, wherein the banking resource comprises an automated teller machine.

4. The self-propelled, mobile transaction resource of claim 1, further comprising:
   a compartment for receiving the user;
   wherein the user interface is located within the compartment.

5. The self-propelled, mobile transaction resource of claim 4, wherein the compartment is secure.

6. The self-propelled, mobile transaction resource of claim 4, wherein the self-propelled, mobile banking resource transports the user to a destination.

7. The self-propelled, mobile banking resource of claim 1, wherein the unmanned, self-propelled, mobile platform further comprises a vertical propulsion system.

8. The self-propelled, mobile banking resource of claim 1, wherein the unmanned, self-propelled, mobile platform is guided remotely.

9. The self-propelled, mobile transaction resource of claim 1, wherein the unmanned, self-propelled, mobile platform is autonomous.

10. The self-propelled, mobile transaction resource of claim 1, wherein the biometric sensor periodically captures the at least one characteristic of the user during the transaction.

11. The self-propelled, mobile transaction resource of claim 1, further comprising a biometric sensor that captures at least one characteristic of the user;
   wherein the biometric sensor continuously captures a behavioral biometric of the user during the transaction.

12. The self-propelled, mobile transaction resource of claim 1, wherein the communications interface receives event data, and the at least one controller further determines the customer location for the unmanned, self-propelled, mobile platform based on the event data.

13. The self-propelled, mobile transaction resource of claim 1, wherein the communications interface receives weather data, and the at least one controller further determines the customer location for the unmanned, self-propelled, mobile platform based on the weather data.

14. The self-propelled, mobile transaction resource of claim 1, wherein the communications interface communicates with a second self-propelled, mobile transaction resource.

* * * * *